United States Patent
Woods et al.

(10) Patent No.: US 10,167,436 B2
(45) Date of Patent: Jan. 1, 2019

(54) METHODS AND APPARATUSES FOR PROCESSING HUMAN WASTE INTO FUEL

(71) Applicant: Sanivation LLC, Wilmington, DE (US)

(72) Inventors: Emily Christine Woods, Oakland, CA (US); Andrew Merrill Foote, Aurora, OH (US)

(73) Assignee: Sanivation LLC, Wilmington, DE (US)

( * ) Notice: Subject to any disclaimer, the term of this patent is extended or adjusted under 35 U.S.C. 154(b) by 293 days.

(21) Appl. No.: 15/292,716

(22) Filed: Oct. 13, 2016

(65) Prior Publication Data

US 2017/0101596 A1 Apr. 13, 2017

Related U.S. Application Data

(60) Provisional application No. 62/241,130, filed on Oct. 13, 2015.

(51) Int. Cl.

| C10L 5/00 | (2006.01) |
|---|---|
| C10L 5/14 | (2006.01) |
| C10L 5/36 | (2006.01) |
| C10L 5/42 | (2006.01) |
| C10L 5/44 | (2006.01) |

(52) U.S. Cl.
CPC ............ *C10L 5/14* (2013.01); *C10L 5/361* (2013.01); *C10L 5/42* (2013.01); *C10L 5/44* (2013.01); *C10L 5/447* (2013.01); *C10L 2290/06* (2013.01); *C10L 2290/24* (2013.01); *C10L 2290/28* (2013.01); *C10L 2290/30* (2013.01); *C10L 2290/36* (2013.01); *Y02E 50/10* (2013.01); *Y02E 50/30* (2013.01)

(58) Field of Classification Search
CPC .... C10L 5/14; C10L 5/361; C10L 5/42; C10L 5/44; C10L 5/447; C10L 2290/06; C10L 2290/24; C10L 2290/30; C10L 2290/36; C10L 2290/28; Y02E 50/10; Y02E 50/30
See application file for complete search history.

(56) References Cited

U.S. PATENT DOCUMENTS

| 8,969,635 B2 * | 3/2015 | Biffinger ............... C10G 1/02 44/307 |
| 2015/0203762 A1 * | 7/2015 | Williams ............... C10L 1/00 585/240 |

FOREIGN PATENT DOCUMENTS

| JP | 2003-055666 A | | 2/2003 |
| JP | 2008050458 | * | 3/2008 |
| RU | 2130048 C1 | | 5/1999 |

OTHER PUBLICATIONS

International Searching Authority, International Search Report and Written Opinion for International Application No. PCT/US2016/056838, dated Feb. 2, 2017, 9 pages, Federal Institute of Industrial Property, Russia.

(Continued)

*Primary Examiner* — Cephia D Toomer
(74) *Attorney, Agent, or Firm* — Alston & Bird LLP

(57) ABSTRACT

Example embodiments provide methods and apparatuses for providing fuel briquettes from human feces. In an example embodiment, feces are treated to inactivate pathogens resident therein and to cause the cellulose material in the feces to undergo a phase transition. The treatment of the feces comprises heating the feces. Briquettes are formed from a mixture comprising the treated feces and carbonized agricultural waste product. The treated feces acts a binder such that the mixture may be formed into briquettes.

16 Claims, 12 Drawing Sheets

(56) References Cited

OTHER PUBLICATIONS

Schönning, Caroline, et al., "Guidelines on the Safe Use of Urine and Faeces in Ecological Sanitation Systems", EcoSanRes Publication Series, Swedish Institute for Infectious Disease Control, 2004, Report 2004-1, 44 pages, Stockholm Environment Institute, Sweden.

Sogokon A.B. "Zachem nuzhen kontsentrator solnechnoy energii? Ili na chto sposoben solnechny kontsentrator?"—Nauchno-prakticheskaya konferentsiya «Energo-i resursoeffektivnost maloetazhnykh zhilykh zdaniy» Institut teplofiziki imeni S.S. Kutateladze SO RAN, 2013, p. 50-57.

Foote, Andrew, "Inactivation of helminth eggs in a solar concentrator and pit latrine + Feasibility review of solar sanitation" (presentation), Proceedings of 61st American Society of Tropical Medicine & Hygiene (ASTMH) Annual Meeting, Nov. 13, 2012, 30 pages, Atlanta, Georgia.

Murphy, Jennifer, L., "Efficacy of a Solar Sanitation System to Reduce *E. coli* and *C. perfringens* spores in Latrine Waste in Kenya" (presentation), National Center for Emerging and Zoonotic Infectious Diseases, Division of Foodborne, Waterborne, and Environmental Diseases, Oct. 15, 2014, CDC, U.S.A.

Sanivation, Inc., "Sanivation, Sanitation as a Service" (Blog), <http://sanivation.com/blog/>, Sep. 30, 2015—Jun. 18, 2016, Internet Archive <https://web.archive.org/web/*/http://sanivation.com/blog>, 4 pages.

Woods, Emiily, et al., "A Market Ready Reuse Option for Human Waste: Feces Briquettes" (brochure), Sanivation Inc, Georgia Institute of Technology, and Emory University, Oct. 16, 2014, 2 pages, U.S.A.

\* cited by examiner

| Fuel | Net Calorific Value (MJ/kg) |
|---|---|
| Log Wood | 14.7 |
| Local Charcoal | 26.2 |
| Fuel Briquettes | 18.7 |

| Physical Characteristics of Fuel Briquettes ||| 
|---|---|---|
| Calorific Value | 21 MJ/kg ||
| Ash Content | 33% ||
| Moisture Content | 5% ||
| Heavy Metals |||
| | Copper | 52 ppm |
| | Zinc | 32 ppm |
| | Lead | 40 ppm |
| | Chromium | 23 ppm |
| | Cadmium | None Detected |
| Performance Characteristics of Fuel Briquettes |||
| Burn Time - Length of time that one kilogram of briquettes produces heat | 3+ hours of heat ||
| Time to Boil (Cold Start, 5L) - Length of time to boil 5L of water beginning with a cold stove | 44 minutes ||
| Time to Boil (Hot Start, 5L) - Length of time to boil 5L of water beginning with a hot stove | 35 minutes ||
| Specific Fuel Consumption (Cold Start)* | 69 g/L ||
| Specific Fuel Consumption (Hot Start)* | 52 g/L ||
| Specific Fuel Consumption (Simmer)* | 45 g/L ||
| Briquettes needed to boil 5L of water for one hour | 0.25 kg ||
| Emissions |||
| | Carbon Monoxide | 39 ppm |
| | PM2.5 | 49 ug/m3 |
| | Carbon Dioxide | 610 ppm |
| * Specific Fuel Consumption: grams of fuel used to complete a given phase of the water boil test, normalized by the number of liters of water used. |||

FIG. 10

METHODS AND APPARATUSES FOR PROCESSING HUMAN WASTE INTO FUEL

BACKGROUND

Many communities throughout the world have very little infrastructure in place for the safe and sanitary handling of human waste. As a result, these communities are subject to a variety of health hazards associated with human waste as well as the general noxious nature of the waste. As such, there is a general need for apparatuses and methods that enable the safe and sanitary handling of human waste in a low-infrastructure environment. There is a further need for the handling of such human waste to be recycled in a safe and sanitary manner.

Additionally, many of the same communities that lack infrastructure of managing human waste also suffer from a lack of access to other resources, such a fuel. Accordingly, there is a need for apparatuses and methods that enable the generation of useable fuel sources from resources readily available in remote, underdeveloped areas.

BRIEF SUMMARY OF THE INVENTION

Various embodiments of the present invention relate to apparatuses and methods for the sanitary handling of human waste products. In particular, various embodiments of the present invention relate to apparatuses and methods for converting human waste products into useful products, such as fuel briquettes.

According to one aspect of the present invention, a method for making fuel briquettes using feces to bind the fuel briquettes is provided. In example embodiments, the method comprises heat treating the feces to inactivate pathogens resident therein and to cause cellulose material in the feces to undergo a bond transition. The method further comprises mixing the treated feces and water to create a homogenous binder. The method further comprises forming briquettes from a mixture comprising the binder and non-carbonized and/or carbonized biomass material, wherein the treated feces acts to bind the mixture such that the mixture may be formed into briquettes.

In example embodiments, the feces are heated using solar radiation. For example, the feces may be heated using a solar concentrator reflector. In example embodiments, the feces are heated to a temperature greater than 55° C. In example embodiments, the heating of the feces causes the cellulose material in the feces to transition into a glass transition state.

In example embodiments, the feces are collected using a waste collection device configured to separate feces from urine. In example embodiments, the treated feces is mixed with water in a 3:1 ratio by mass (water : treated feces) to create the binder. In example embodiments, the binder and the carbonized biomass material are combined at a ratio of 5:2 by mass (carbonized biomass material : binder). In example embodiments, the binder, water, and the carbonized biomass material are combined in multiples or factors of (a) 15 liters of binder, (b) 45 liters of water, and (c) 130 kilograms of carbonized biomass material. For example, the carbonized biomass material, non-carbonized biomass material, and binder may be combined at a ratio of 2:1:1 by mass (carbonized biomass material : non-carbonized biomass material : binder). In example embodiments, the carbonized biomass material is ground into a fine charcoal dust before being mixed with the treated feces. In example embodiments, the carbonized biomass material comprises carbonized agricultural waste products. In an example embodiment, the non-carbonized biomass material comprises saw dust.

In example embodiments, the briquettes are formed by rolling carbonized biomass material dust in the binder, thereby creating a larger and larger briquette, until the desired briquette size is reached. In example embodiments, the desired briquette size is approximately a sphere having a diameter of approximately 2 inches. In example embodiments, the briquettes are formed by molding the mixture into a desired briquette shape having a desired briquette size. In example embodiments, the briquettes are formed by an agglomerator, extruder, pillow press, roll press, or piston press.

According to another aspect of the present invention, fuel briquettes are provided. In example embodiments, the fuel briquette comprises a binder. The binder comprises treated feces that have been heat treated to inactivate pathogens resident therein and to cause cellulose material in the feces to undergo a bond transition. The binder further comprises water. The treated feces and water are mixed to provide a homogenous binder. The fuel briquettes further comprise non-carbonized and/or carbonized biomass material, wherein the treated feces acts to bind the non-carbonized and/or carbonized biomass material into the briquette.

According to yet another aspect of the present invention, a method for inactivating pathogens resident in feces is provided. In example embodiments, the method comprises using solar thermal radiation to heat the feces to at least 55° C. and maintaining the feces at a temperature of at least 55° C. for at least one hour.

In example embodiments, the method further comprises positioning the feces along a focal axis of a solar concentrator reflector and using the solar concentrator reflector to apply the solar thermal radiation to the feces. In example embodiments, the solar thermal radiation is used to heat the feces up to at least 65° C. and the feces are maintained at a temperature of at least 65° C. for at least three hours.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 1 provides a high level flowchart of a waste processing method according to one embodiment;

Figure 4:
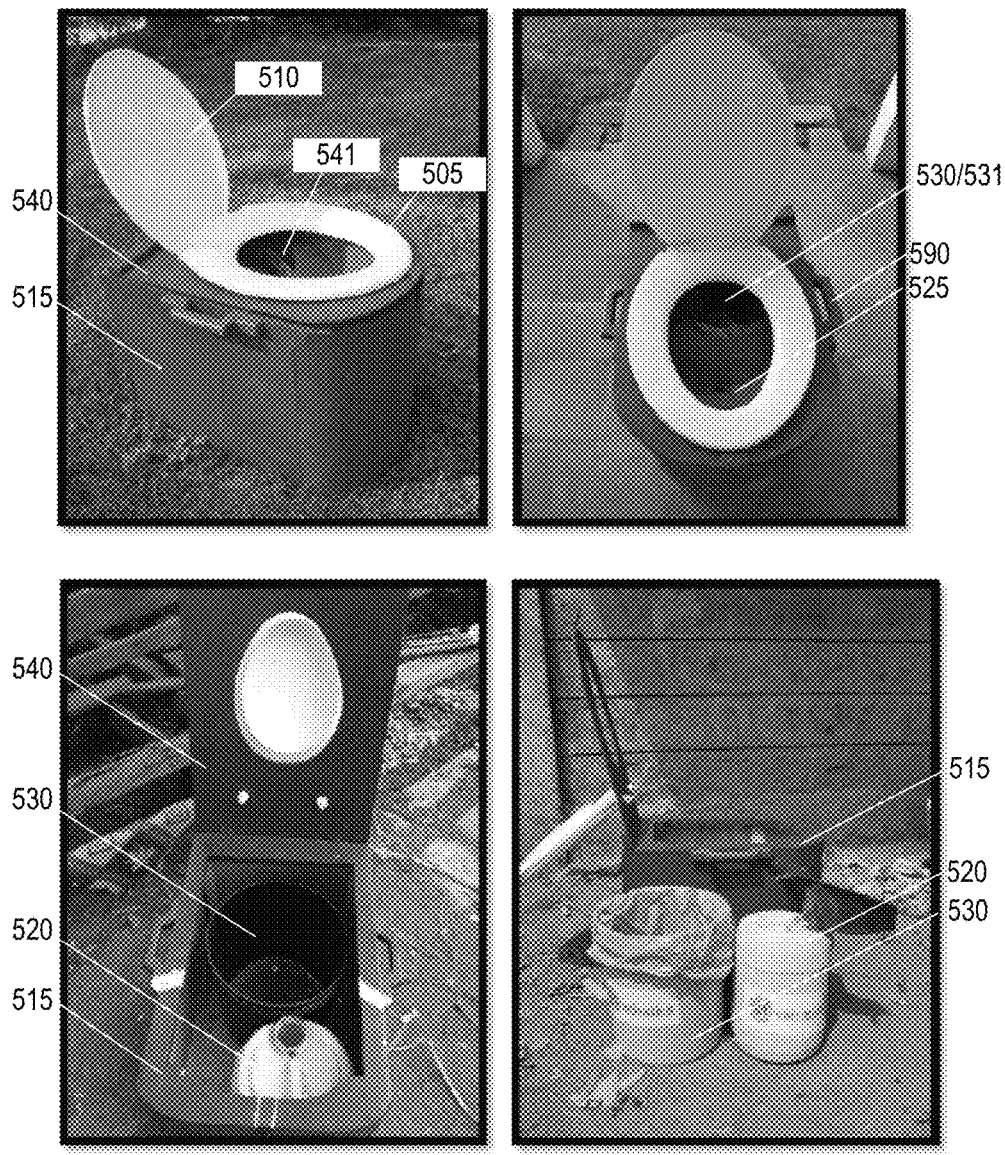
Figure 5A:
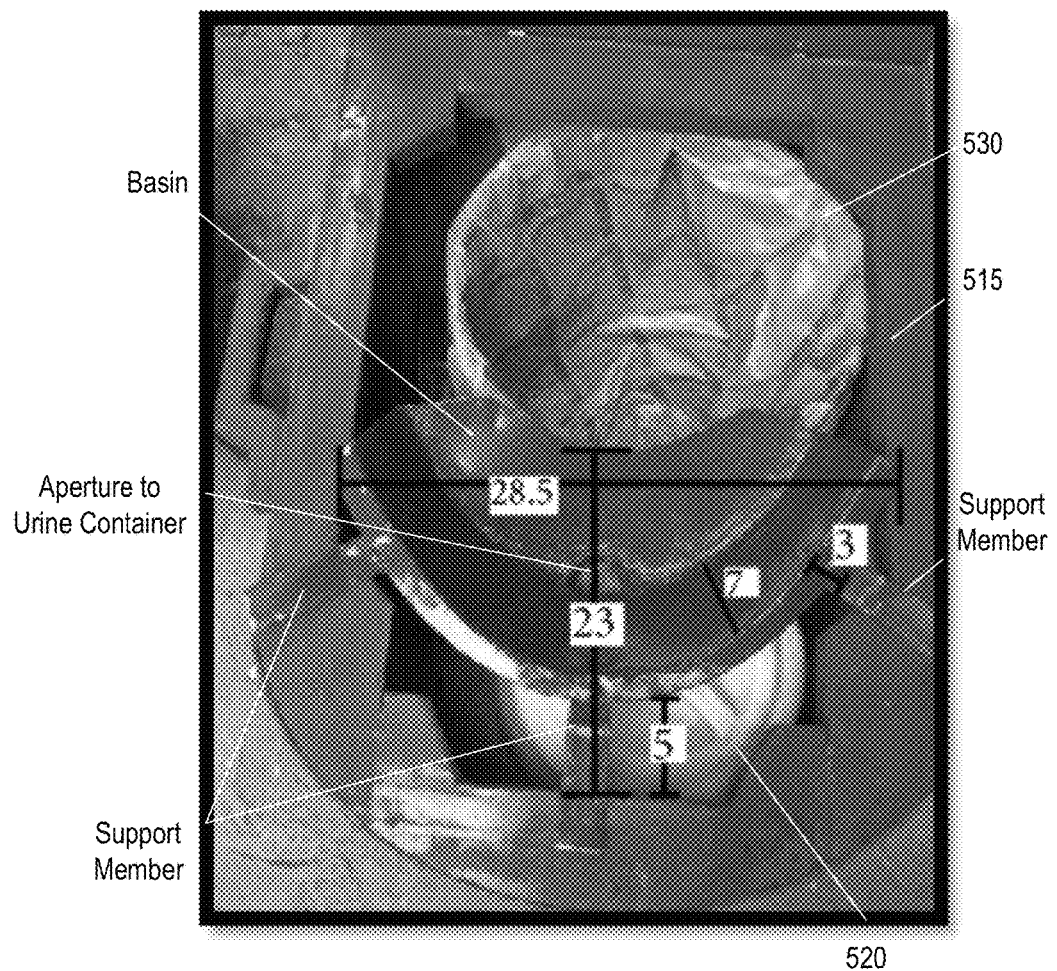
Figure 5B:
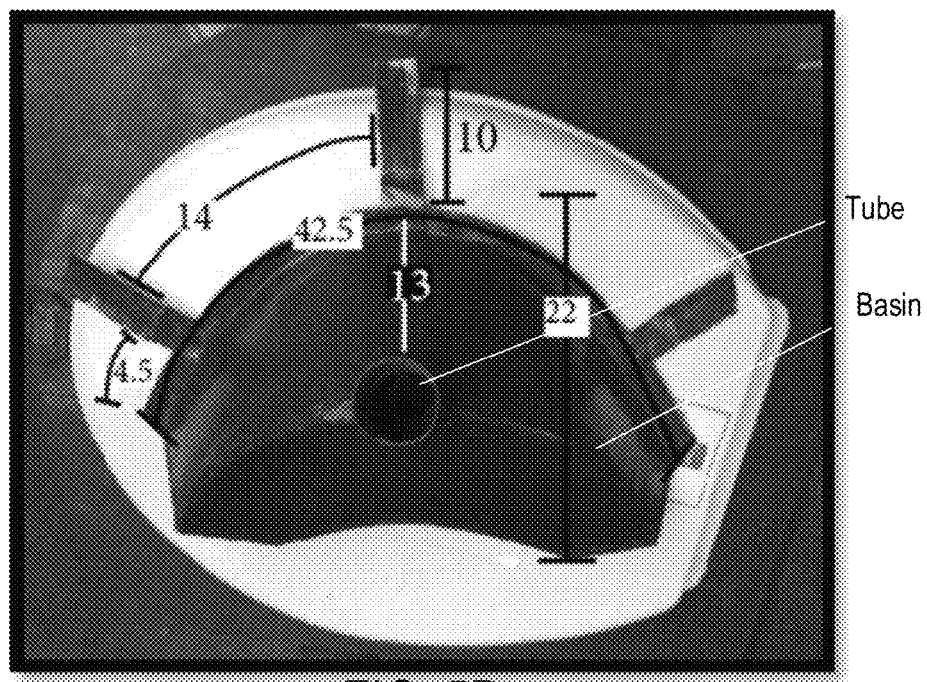
Figure 5C:
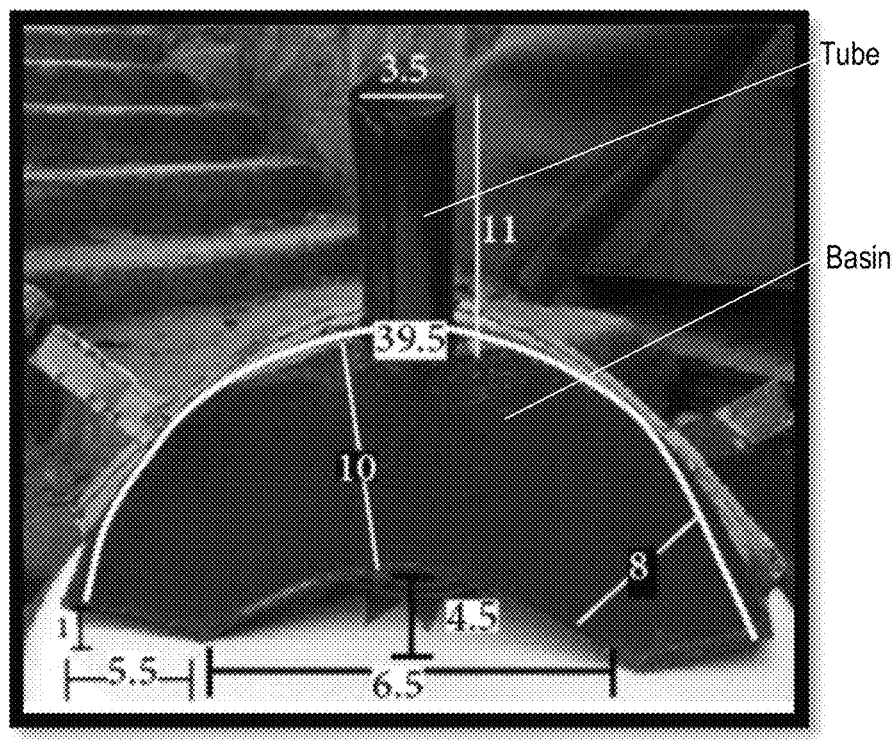
Figure 7:
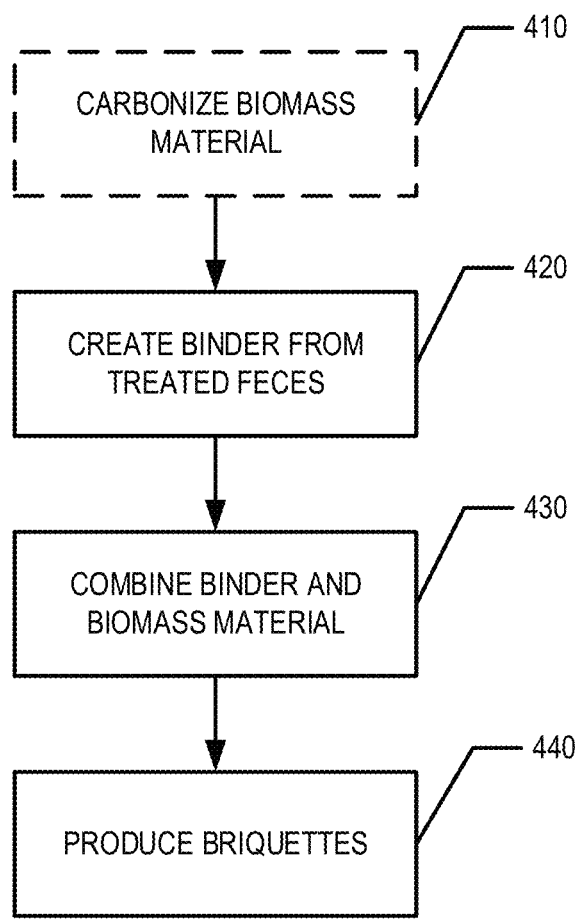
Figure 8A:
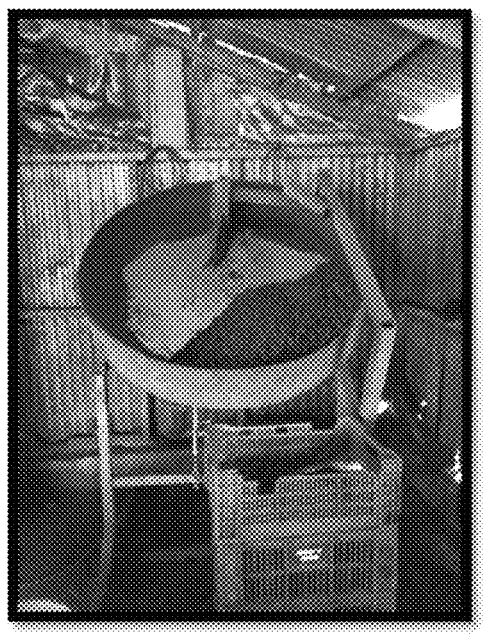
Figure 8B:
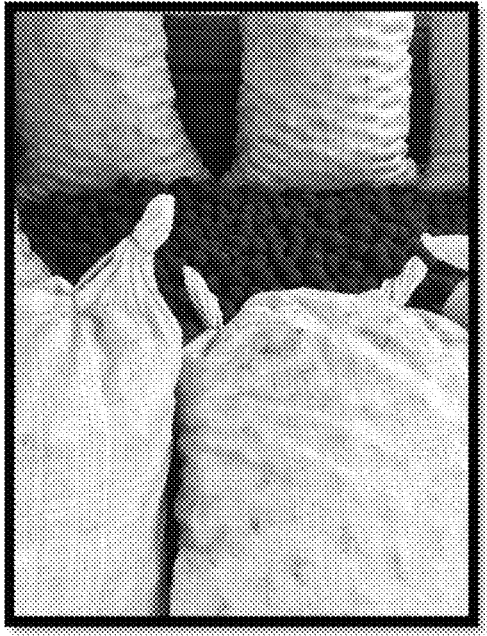
Figures 9A, 9B:
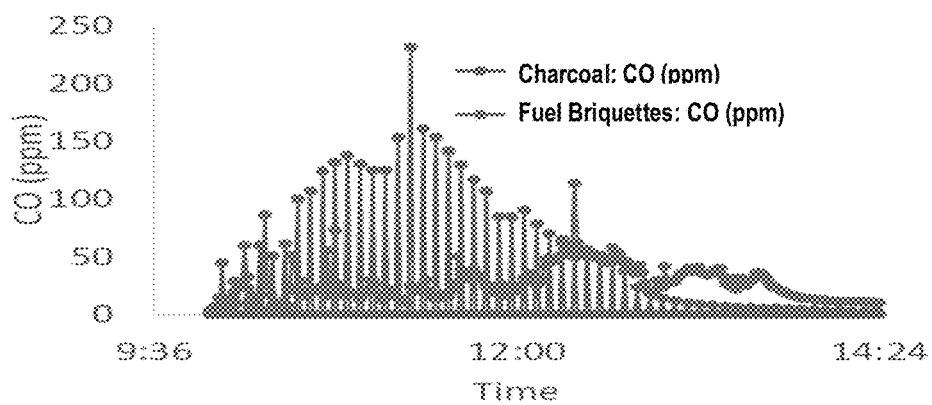

FIG. 4 provides various photos of a waste collection device according to one embodiment;

FIGS. 5A-5C provide views of a urine diverter according to one embodiment;

FIG. 6A-6D provide views of a solar concentrator apparatus according to various embodiments;

FIG. 7 provides a high level flowchart of a method of forming fuel briquettes from treated human waste;

FIG. 8A-8B illustrate an example agglomerator and resulting fuel briquettes;

FIGS. 9A and 9B compare the performance of fuel briquettes of example embodiments to other fuels; and FIG. 10 provides a table describing physical and performance characteristics of the fuel briquettes of an example embodiment.

DETAILED DESCRIPTION OF THE INVENTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein. Rather, these embodiments are provided so that this disclosure will satisfy applicable legal requirements. Like numbers refer to like elements throughout.

I. Overview

Figure 1:
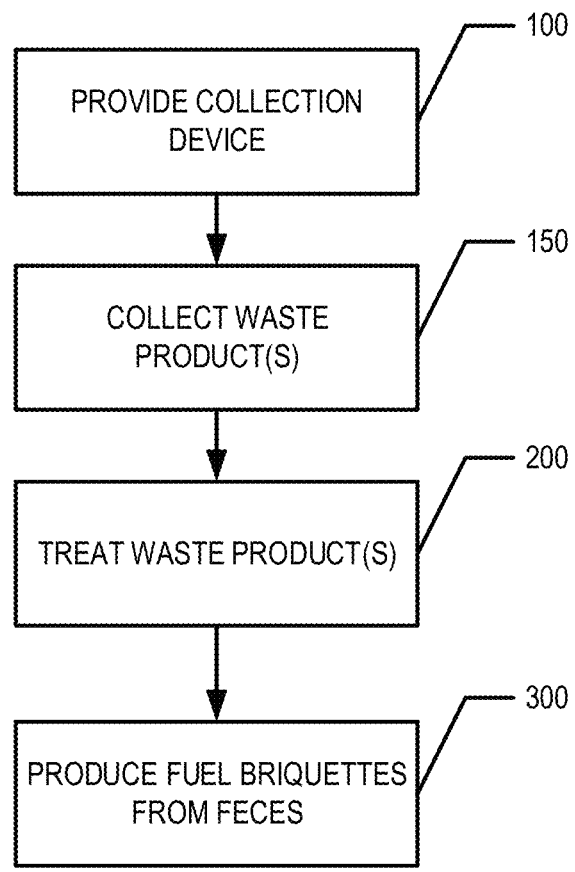

As noted above, various embodiments of the present invention relate to apparatuses and methods for the sanitary handling of human waste products. In certain embodiments, theses apparatuses and methods enable the conversion of human waste products into useful products, such as fuel briquettes. FIG. 1 provides a flowchart illustrating a general overview of waste processing method involving steps 100, 150, 200, and 300 according to various embodiments.

In the waste processing method of FIG. 1, waste collection devices are first provided at step 100. As detailed herein, the waste collection devices may be—for example—toilets configured to separate and store feces and urine into storage containers. The waste collection devices may be provided to various members of a community in order to collect waste from the community over a given period of time. As an example, cleaned waste collection devices may be provided and replaced on a daily, biweekly, weekly, or monthly basis. This repetitive process can be implemented, for example, as part of a subscription service for members of the community. For example, a collection device and/or portions thereof may be provided as part of a subscription service.

Next, at step 150, the human waste products are collected from the distributed waste collection devices. As detailed herein, the waste collection devices may include removable portions for storing feces and urine separately in order to enable efficient removal and collection of human waste products. In various embodiments, community members may collect human waste products individually and provide them to a central collection facility, or toilet servicers may be dispatched to collect human waste products directly from the distributed waste collection devices.

Next, at step 200, the human waste products collected in step 150 are treated to render them sanitary for further processing. The collected feces may be treated, for example, to inactivate pathogens present in the collected feces. As detailed herein, this can be accomplished using a solar concentrator (e.g., for treating fecal matter) or a solar water heater (e.g., for treating urine).

At step 300, the treated feces can be converted into fuel briquettes. According to various embodiments, the treated feces are combined with biomass material and/or carbonized biomass material (e.g., agricultural waste) and molded into fuel briquettes. The fuel briquettes can be suitable for use as burnable fuel for cooking (e.g., as a replacement for conventional charcoal). Various aspects of theses process steps will now be described in more detail.

II. Collection of Waste Product(s)

As discussed above, in step 100 of the waste processing method of FIG. 1 waste collection devices are provided to community. According to various embodiments, each waste collection device generally comprises a toilet configured for a person to urinate and/or defecate into (e.g., in a seated position). However, each waste collection device is configured to operate dry and without an integrated source of running water. In addition, each waste collection device is configured to separate and store feces and urine into storage containers.

Figure 2:
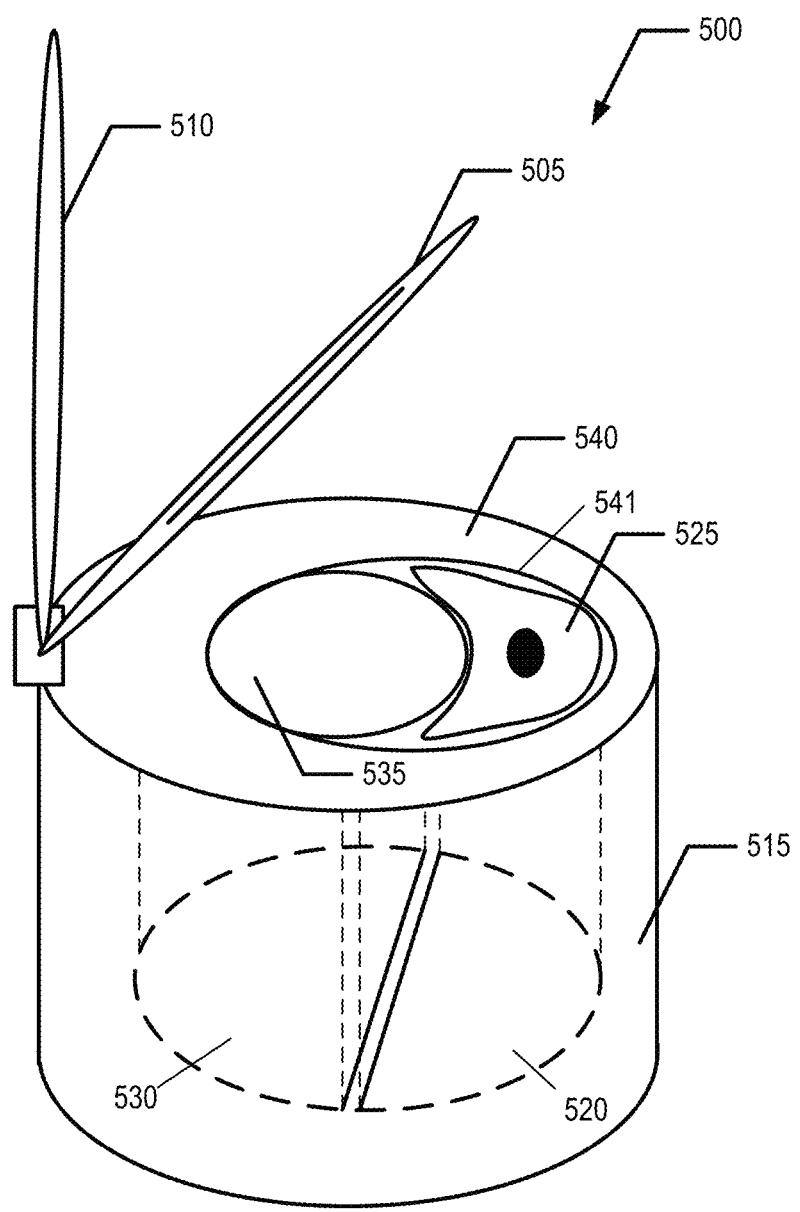
FIG. 2 illustrates a semi-schematic view of a waste collection device according to one embodiment.

FIG. 2 illustrates a semi-schematic diagram of a waste collection device 500 according to one embodiment of the present invention. As shown in FIG. 2, the waste collection device 500 comprises a structural housing 515, a urine container 520, a urine diverter member 525, a feces container 530, a housing cover 540, a toilet seat 505, and a toilet seat cover 510. In various embodiments, the structural housing 515 comprises a base and one or more sidewalls together defining an internal volume, which houses the feces container 530 and the urine container 520. The housing 515 may be formed, for example, by any suitable structural material, such as molded plastic, wood, or metal. In addition, exterior handles 590 are provided on upper portions of the housing 515 to facilitate transport of the waste collection device 500.

Figure 3:
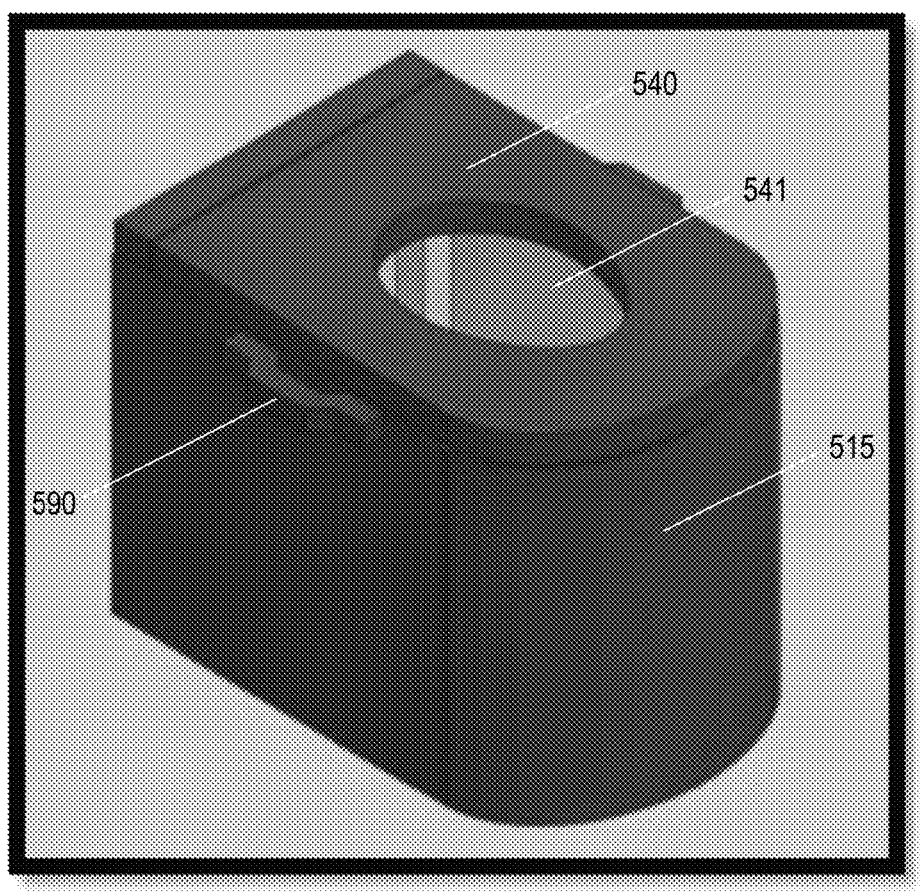
FIG. 3 illustrates a perspective view of a waste collection device (with its toilet seat and toilet seat cover removed) according to one embodiment.

FIG. 3 illustrates a perspective view of the waste collection device 500 with its toilet seat 505 and toilet seat cover 510 removed. As can be appreciated from FIGS. 2 and 3, the housing 515 also provides structural support for the cover 540, which is secured to an upper portion of the housing 515 and partially encloses the housing's internal volume. As shown in FIGS. 2 and 3, the cover 540 defines an oval-shaped central opening 541 aligned above the feces container 530 and the urine container 520. The central opening 541 is configured such that a person may sit on the toilet seat 505 and be positioned to provide urine to the urine container 520 and/or feces to the feces container 530. The cover 540 is secured to the housing 515 by a hinge and configured to move between an open and closed position. In the closed position, the cover 540 may configured with a lock to secure the feces container 530 and the urine container 520 inside the housing 515.

The toilet seat cover 510 and toilet seat 505 are also hingedly connected to the housing 515 and configured to move between upper and lower positions. In particular, the toilet seat cover 510 is configured to cover the hole in the toilet seat 505 such that when the collection device 500 is not in use, the feces container 530 and the urine container 520 are enclosed within the collection device 500. For example, when the toilet seat cover 510 is in the closed position, the feces and/or urine containers are not accessible. When the toilet seat cover 510 is in the open position, the feces and/or urine containers are accessible. In various embodiments, the toilet seat 505 and toilet seat cover 510 may be formed from molded plastic or any other suitable material.

Referring back to FIG. 2, the feces container 530 defines an upper opening 535 through which feces can be deposited into the container 530. As noted above, the upper opening 535 of the feces container 530 is generally aligned with at least a portion of the cover's central opening 541. In various embodiments, the feces container is removably positioned within the housing's interior volume. In particular, when the cover 540 is pivoted to an open position, the feces container 530 can be removed from the housing 515 (and subsequently replaced). When the housing 540 is in the closed position, the feces container 530 cannot be removed from the housing 515. In various embodiments, the container's upper opening 535 permits a desiccant cover material (e.g., ash) to be placed over fresh feces after being deposited into the feces container 530. FIG. 4 provides various photos of the waste collection device 500 illustrating various other views of the device's components, including the feces container 530.

As indicated in FIG. 2, urine container 520 includes an upper opening in communication with a urine diverter member 525. According to various embodiments, the urine diverter member 525 is generally configured to capture urine deposited into the waste collection device 500 and divert the captured urine into the urine container 520 to be collected separately from the fecal matter captured in the feces container 530. In particular, the urine diverter 520 is configured to provide this function during use by both male and female users.

FIG. 5A shows an overhead view of the urine diverter member 525 secured to the housing 515. As shown in FIG. 5A, the urine diverter member 525 comprises a basin defining a central aperture. The basin also includes outwardly extending support members configured to engage the housing 515 to suspend the urine diverter member 525 over the urine container 520. As can be appreciated from FIG. 5A, the urine diverter's basin forms a generally half-moon shaped receptacle configured to capture urine and direct the urine into the basin's central aperture. FIG. 5A provides numerous dimensions (in centimeters) of one embodiment of the urine diverter 525.

FIG. 5B provide a view of the underside of the urine diverter 525, while FIG. 5C provides a side view of the urine inverter 525 (positioned upside down). As can be seen in FIGS. 5B and 5C, the urine diverter 525 includes a tube extending downwardly from the underside of the basin. The tube is in communication with the basin's central aperture and configured to direct urine captured by the basin into urine container 520. For example, in one embodiment, the urine diverter's tube is positioned in an upper opening of the urine container 520. FIGS. 5B and 5C also provide numerous dimensions (in centimeters) of the urine diverter 525.

Similarly to the feces container, the urine container 520 is removably positioned within the housing's interior volume. In particular, when the cover 540 is pivoted to an open position, the urine container 520 can be removed from the housing 515 (and subsequently replaced). When the housing 540 is in the closed position, the urine container 520 cannot be removed from the housing 515. Indeed, according to various embodiments, the feces container 530 and/or the urine container 520 are configured to be capped and removed from the collection device 500 to facilitate removal of the capture fecal matter for treatment.

III. Treatment of Waste Product(s)

As noted above, human waste products collected in step 150 are treated in step 200 to render them sanitary for further processing. According to various embodiments, a solar concentrator is provided for inactivating pathogens in the collected human waste. Generally, the collected feces can be deposited into a barrel on which solar energy is concentrated via the solar concentrator. This action increases the temperature of the feces in the barrel over a period of time in a manner sufficient to inactivate pathogens in the feces.

Figure 6A:
Figure 6B:
Figure 6C:
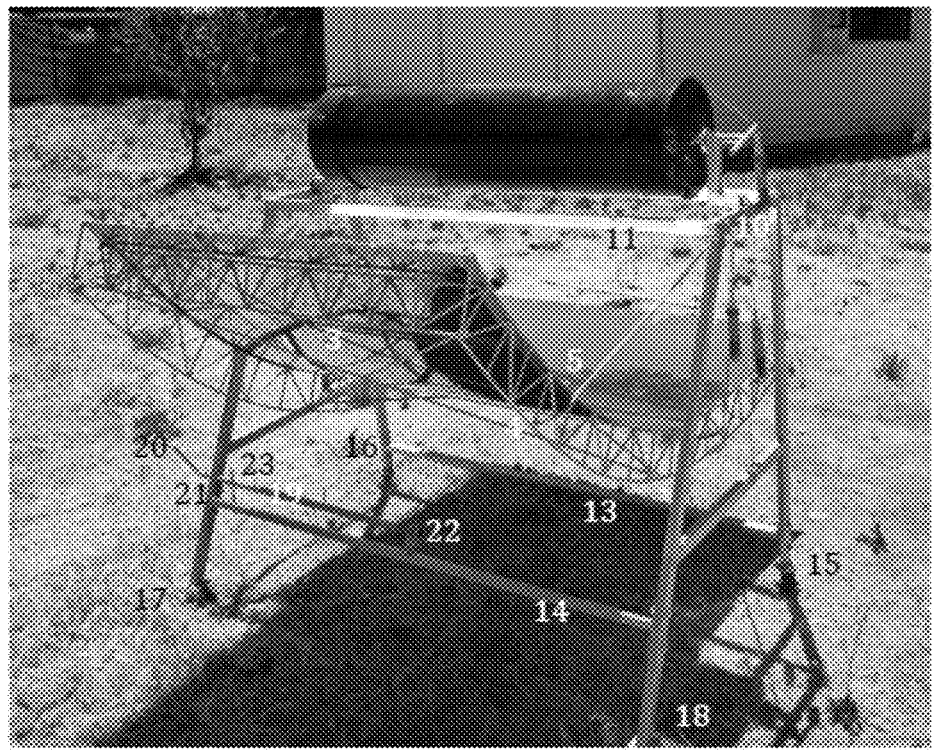

FIGS. 6A, 6B, and 6C illustrate a solar concentrator reflector 1 according to one embodiment. In the illustrated embodiment, the solar concentrator reflector 1 is made of a thin polished steel sheet. The sheet is bolted into a steel frame, thereby creating a reflector subassembly. The steel frame is made of many short diameter (e.g., 1 mm) steel bars 2 welded together in triangular shapes to achieve the desired parabolic shape. This parabolic shape focuses sunlight reflection at a specified focal distance.

The triangular bars are supported by eight long horizontal steel bars 3 running parallel to the focal axis and four curved longer bars 4 running parallel to the parabolic curve of the reflector. The reflector sub-assembly is free to rotate by hanging from four longer steel bars 5 welded to the frame and being attached to the aluminum base by a pin and washer connection 6, which is attached by a bolt into the aluminum base. This allows the frame angle to the sun to be adjusted around the focal axis.

The base sub-assembly is constructed with aluminum bars in an "A" frame shape bolted together at the joints. Vertical bars 7, 8 are connected via horizontal bars 9, 10 in the "A" frame shape. The two sides of the base are connected by horizontal bars running parallel to the focal axis above the reflector 11, 12 and bellow the reflector 13, 14. The aluminum base's four vertical bars are supported to the ground via rubber wheels 15-18. The two back wheels 17, 18 have mechanical break latches to hold the base in place. The wheels allow for easy tracking of the direction of the sun.

According to various embodiments, the reflector and frame sub-assembly can be set to track the azimuth of the sun using the tracking sub-assembly. The tracking sub-assembly is composed of a small diameter thin bar 19, the tracking bar, free to rotate via the tracking handle 20. The tracking bar is attached to the base via a hole through the aluminum bar in the base subassembly 21 and pin 22. Attached to the steel tracking bar is a steel wire which then connects to the free swinging reflector sub-assembly. When the tracking handle 20 is mechanically rotated, the wire wraps around the tracking bar 19 and the tension pulls the reflector sub assembly to the desired angle to match the sun's position in the sky. Attached to the tracking bar is a removable pin. The pin 23 hangs through the tracking bar 19 and uses a reactive force against the base to hold the tracking subassembly at the desired position.

According to various embodiments, the container sub-assembly can be designed in numerous different methods depending on the shape of the container to be placed on the system. FIG. 6A shows one container sub assembly where a container holder is bolted into the frame on both sides of the base 24. The container itself 25 is a steel, re-purposed 45 L drum modified with aluminum bars 26 to aid the container integration to the solar concentrator. The container sub-assembly may be placed generally along the focal axis of the reflector 11, 12. This system allows the container to rotate parallel with the focus axis to aid mixing of the waste in the container. FIG. 6B shows a different container sub-assembly where a container holder 26 is bolted to the aluminum frame. The container is a larger 70 L per-purposed steel drum also painted black placed in the holder. This container sub-assembly shown in FIGS. 6B and 6C is not attached to the holder and therefore users are able to rotate the container to aid in mixing.

In order to inactivate pathogens in human waste via solar thermal, the solar concentrator should reach temperatures that have been shown to render waste safe for reuse. For example, temperatures upwards of 55 degrees Celsius for over an hour have been sufficient. Other time and temperature combinations have shown to render waste safe for reuse and are these combinations are referred to the "zone of safety". Due to the diurnal nature of the sun and solar heating, the solar concentrator is designed to reach "zone of safety" temperatures in one-day time.

Assuming that the system could, for example, have an efficiency of 40%, and with an average solar radiation of 5 kWh/m²/day, and accounting for an estimated heat dissipation in low humidity air, the solar mirror in one embodiment is 1.5 m² or more. The parabolic concentrator trough is, for example, 1.7×1 meters with the formula $y=x^2/4a$, where a is equal to the focal length, y to the vertical coordinates and x to the horizontal coordinates.

Figure 6D:
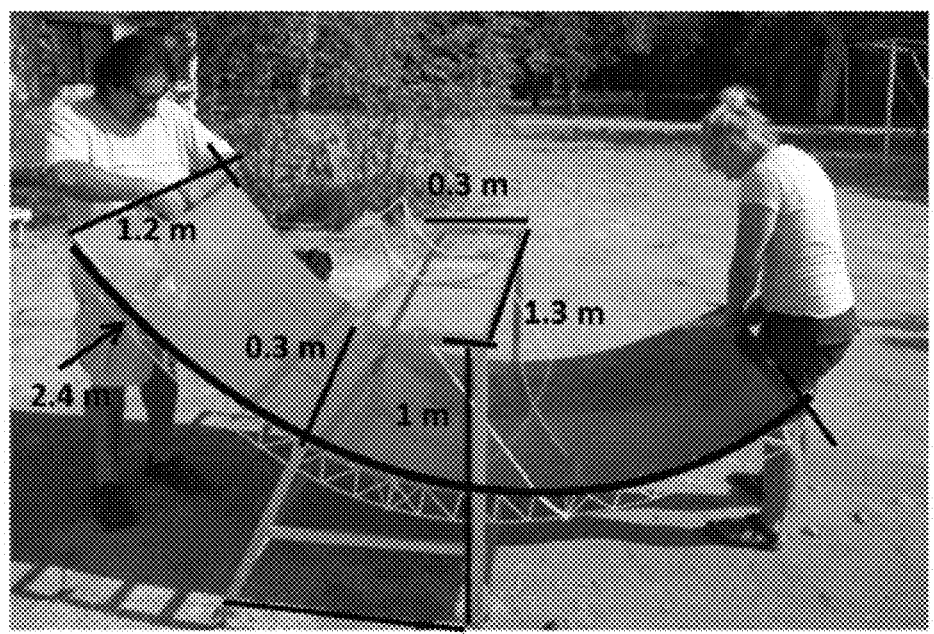

The concentrator can be manufactured with 0.005m stainless steel for its high reflexivity, while the 50 L drum can be welded from black aluminum due to its high heat transfer coefficients. The dimensions of the 50 L drum (e.g., 1.0 meter radial axis; 0.26 meter diameter) can maximize the surface area receiving direct and concentrated thermal energy while maintaining maneuverability. FIG. 6D provides detailed dimensions of various aspects of the solar concentrator.

According to various embodiments, feces may be positioned in the barrel support and the parabolic mirror can be aligned with the sun. The feces may then be heated, via solar radiation (e.g., solar thermal radiation), to temperatures of greater than, for example, 55° C. In example embodiments, the feces may be maintained at 55° C. for longer than an hour (e.g., three hours or more). In some example embodiments, the feces may be heated to a temperature of 65° C. or more for longer than an hour (e.g., three hours or more). In some embodiments, the feces may be heated to temperatures of approximately 95° C.

IV. Conversion of Feces to Fuel Briquettes

At step 300 in the process of FIG. 1, fuel briquettes are produced from the treated feces treated in step 200. According to various embodiments, the treated feces may be combined with biomass material and/or carbonized biomass material to create fuel briquettes. In particular, the treated feces acts as a binder for producing fuel briquettes out of this material. Indeed, approximately 30% of the solid content of human feces is composed of cellulose material. In addition to inactivating pathogens resident within the feces, the treatment of the feces also causes the cellulose material in the feces to undergo a chemical/bond transition. In particular, the cellulose material may be forced into a glass transition state where there is a higher mobility of molecules. This higher mobility of the molecules within the cellulose material allows for improved binding of the biomass material(s) and/or carbonized biomass material(s).

FIG. 4 provides a flowchart illustrating a process for converting feces to fuel briquettes. Beginning at step 410, biomass material(s) are first carbonized. The biomass material(s) may comprise agricultural waste products, saw dust, other waste products, and/or other biomass material. In an example embodiment, the biomass material comprises agricultural waste products comprising rose waste. In various embodiments, the carbonization of the biomass material may occur in four stages. In the first stage, the biomass material is dried to reduce the amount of water within the biomass material. In various embodiments, the drying process is completed a temperature of, for example, 110-200° C. The second stage, the pre-carbonization stage, occurs at approximately 170-300° C. wherein endothermic reactions cause the production of pyroligneous liquids such as methanol and acetic acid and some non-condensable gases such as carbon monoxide and carbon dioxide. The third stage, occurs at approximately 250-300° C. In the third stage, exothermic reactions produce and/or release the bulk of light tars and pyroligneous acids produced in the pyrolysis process from the biomass of the agricultural waste product(s). During the final stage, at temperatures greater than 300° C., the biomass of the biomass material is transformed into charcoal. In some embodiments, the carbonized biomass material(s) are ground to provide a fine charcoal dust. For example, the fine charcoal dust may comprise charcoal particles with a particle size of less than 3 mm.

At step 420, the treated feces is used to create a binder. For example, the treated feces may be combined with water to form a binder. For example, the feces may be treated using a process such as that described above with respect to step 200. In particular, the feces may be treated to inactivate pathogens resident within the feces and to cause the cellulose material in the feces to undergo a chemical/bond transition that transforms the feces into a material that may be used as a binder in the resulting briquettes. The treated feces is then mixed into a homogeneous mixture and water is added to create a binder. For example, the treated feces generally exits treatment with a moisture content of approximately 75%. Water may then be added and/or mixed into the treated feces in a 3:1 ratio by mass (water : feces) to create a binder.

Next, at step 430, non-carbonized and/or carbonized biomass material(s) are combined with the binder. For example, in some embodiments, the fuel briquettes may comprise biomass material that has not been carbonized. In some embodiments, the fuel briquettes may comprise carbonized biomass material(s). In some embodiments, the fuel briquettes may comprise a combination of carbonized and non-carbonized biomass material. For example, the binder may be combined with non-carbonized and/or carbonized biomass material(s) in an agglomerator to create the final fuel briquettes. In some embodiments, additional water is added in the agglomerator to create the final fuel briquettes. As an example, in one embodiment, carbonized biomass material(s) and the binder may be combined at a ratio of 5:2 by mass (carbonized biomass material : binder). In another example, approximately 15 liters of binder is mixed with approximately 45 liters of water and approximately 130 kg of carbonized biomass material(s). In an example embodiment, the 130 kg of carbonized biomass material(s) are provided as a fine charcoal dust. In yet another example, carbonized biomass material (e.g., carbonized agricultural waste product(s)), non-carbonized biomass material (e.g., saw dust), and the binder may be combined at a ratio of 2:1:1 by mass (carbonized biomass material(s) : non-carbonized biomass material : binder).

At step 340, the non-carbonized and/or carbonized biomass material(s) and binder (e.g., homogenous treated feces and water mixture) is made into fuel briquettes. The binder, and in particular the treated feces within the binder, acts to bind the non-carbonized and/or carbonized biomass material(s) together to provide fuel briquettes that are not brittle and do not release a significant amount of charcoal dust. In particular, the agglomerator continuously rolls the carbonized dust in the binder creating larger and larger charcoal until they reach the desired size (e.g., 2 inch diameter spheres). This process can produce, for example, 1 tone per hour. FIG. 8A illustrates an example agglomerator, while FIG. 8B illustrates fuel briquettes made from this process. As should be understood, various other briquetting machines, in addition to and/or in place of an agglomerator, may be used to make the fuel briquettes. For example, extruders, pillow presses, roll presses, piston presses, and/or the like may be used to make the fuel briquettes. Additionally, in some embodiments, the fuel briquettes may be formed by hand and/or using a mold.

FIGS. 9A and 9B compare the performance of the fuel briquettes to the performance of example embodiments to charcoal. The fuel briquettes may be burned to provide heat for cooking, and/or the like. Burning the fuel briquettes produces lower levels of carbon monoxide than traditional charcoal briquettes and last longer than traditional charcoal briquettes. The final produced fuel briquettes has no odor and less smoke than local charcoal from wood. This fecal based fuel briquettes have average emissions of 60 ppm carbon dioxide which is significantly lower than wood charcoal which has an average of 300 ppm. The net caloric value of the fuel briquettes is between 17-19 MJ/kg and the fuel briquettes burn almost 3 times longer than local charcoal from wood.

The table shown in FIG. 10 provides the results of a water boil test (WBT) of fuel briquettes of an example embodiment of the present invention. In particular, the tested fuel briquettes were made by combining 15 liters of a homogenous mixture of treated feces having a moisture level of approximately 80%, 45 liters of water, and 130 kg of fine charcoal dust produced from carbonized agricultural waste product(s).

V. Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for making fuel briquettes using feces to bind the fuel briquettes, the method comprising:
   heat treating the feces to inactivate pathogens resident therein and to cause cellulose material in the feces to undergo a bond transition;
   mixing the treated feces and water to create a homogenous binder; and
   forming briquettes from a mixture comprising the binder and non-carbonized and/or carbonized biomass material, wherein the treated feces acts to bind the mixture such that the mixture may be formed into briquettes.

2. The method of claim 1, wherein the feces are heated using solar radiation.

3. The method of claim 1, wherein the feces are heated using a solar concentrator reflector.

4. The method of claim 1, wherein the feces are collected using a waste collection device configured to separate feces from urine.

5. The method of claim 1, wherein the feces are heated to a temperature greater than 55° C.

6. The method of claim 1, wherein the heating of the feces causes the cellulose material in the feces to transition into a glass transition state.

7. The method of claim 1, wherein the binder is created by mixing the treated feces and water in a 3:1 ratio by mass (water : treated feces).

8. The method of claim 1, wherein the carbonized biomass material and the binder are combined at a ratio of 5:2 by mass (carbonized biomass material : binder).

9. The method of claim 1, wherein the binder, water, and the carbonized biomass material are combined in multiples or factors of (a) 15 liters of binder, (b) 45 liters of water, and (c) 130 kilograms of carbonized agricultural waste product.

10. The method of claim 1, wherein the carbonized biomass material, non-carbonized biomass material, and binder are combined at a ratio of 2:1:1 by mass (carbonized biomass : non-carbonized biomass : binder).

11. The method of claim 1, wherein the carbonized biomass material comprises carbonized agricultural waste.

12. The method of claim 1, wherein the carbonized biomass material is ground into a fine charcoal dust before being mixed with the binder.

13. The method of claim 1, wherein the briquettes are formed by rolling carbonized biomass material dust in the binder until a desired briquette size is reached.

14. The method of claim 1, wherein the briquettes are formed by molding the mixture into a desired briquette shape having a desired briquette size.

15. The method of claim 1, wherein the briquettes are formed by an agglomerator, extruder, pillow press, roll press, or piston press.

16. The method of claim 15, wherein the briquette is approximately a sphere and the desired briquette size is approximately a sphere having a diameter of approximately 2 inches.

* * * * *